US010047992B2

(12) United States Patent
Ushijima

(10) Patent No.: US 10,047,992 B2
(45) Date of Patent: Aug. 14, 2018

(54) AIR-CONDITIONING SYSTEM USING CONTROL OF NUMBER OF COMPRESSORS BASED ON PREDETERMINED FREQUENCY RANGES

(71) Applicant: Mitsubishi Electric Corporation, Tokyo (JP)

(72) Inventor: Takahiro Ushijima, Tokyo (JP)

(73) Assignee: Mitsubishi Electric Corporation, Tokyo (JP)

(*) Notice: Subject to any disclaimer, the term of this patent is extended or adjusted under 35 U.S.C. 154(b) by 354 days.

(21) Appl. No.: 14/879,282

(22) Filed: Oct. 9, 2015

(65) Prior Publication Data
US 2016/0161165 A1   Jun. 9, 2016

(30) Foreign Application Priority Data

Dec. 4, 2014   (JP) .................................. 2014-246035

(51) Int. Cl.
*F25B 49/02*   (2006.01)
*F25D 21/00*   (2006.01)
(Continued)

(52) U.S. Cl.
CPC .............. *F25B 49/022* (2013.01); *F24F 1/08* (2013.01); *F24F 11/30* (2018.01); *F24F 11/62* (2018.01);
(Continued)

(58) Field of Classification Search
CPC .......... F25B 2313/023; F25B 2313/025; F25B 2400/06; F25B 2400/061; F24F 1/08; F24F 2011/0067
See application file for complete search history.

(56) References Cited

U.S. PATENT DOCUMENTS 2,796,743 A * 6/1957 McFarlan ................ F24F 5/001
                                                    62/324.1
4,157,649 A * 6/1979 Bussjager ................ F25B 13/00
                                                    62/160
(Continued)

FOREIGN PATENT DOCUMENTS

EP      1 610 070 A1    12/2005
JP       61-165532 A     7/1986
(Continued)

OTHER PUBLICATIONS

Japanese Office Action dated Mar. 21, 2017 in the corresponding JP application No. 2014-246035. (English translation attached).
(Continued)

*Primary Examiner* — Frantz Jules
*Assistant Examiner* — Nelson Nieves
(74) *Attorney, Agent, or Firm* — Posz Law Group, PLC

(57) ABSTRACT

A low-cost and highly-efficient air-conditioning system including an AHU using refrigerant of a heat pump cycle as a heat source, and capable of reducing an on/off cycle operation of compressors at a time of a low load, the system including: a plurality of outdoor units; an air handling unit; a plurality of independent heat pump cycles formed by connecting the plurality of outdoor units and the air handling unit by refrigerant pipes, each of the plurality of independent heat pump cycles including a compressor, an indoor heat exchanger, an expansion valve, and an outdoor heat exchanger; and a number control unit controlling, to satisfy a capacity demand corresponding to an air-conditioning load, based on a particular frequency range associated with the compressor, in which a certain compressor efficiency or more is obtained, a number of the compressors in operation and operating frequencies of the respective compressors in operation.

14 Claims, 10 Drawing Sheets

(51) Int. Cl.
  *F25B 30/02* (2006.01)
  *F25B 31/00* (2006.01)
  *F24F 1/08* (2011.01)
  *F24F 11/30* (2018.01)
  *F24F 11/62* (2018.01)
  *F25B 13/00* (2006.01)
  *F25B 47/02* (2006.01)
  *F24F 140/50* (2018.01)
  *F24F 140/60* (2018.01)

(52) U.S. Cl.
  CPC .............. *F25B 30/02* (2013.01); *F25B 31/00* (2013.01); *F25D 21/006* (2013.01); *F24F 2140/50* (2018.01); *F24F 2140/60* (2018.01); *F25B 13/00* (2013.01); *F25B 47/025* (2013.01); *F25B 2313/0253* (2013.01); *F25B 2600/01* (2013.01); *F25B 2600/0253* (2013.01); *Y02B 30/741* (2013.01)

(56) References Cited

U.S. PATENT DOCUMENTS

| | | | | |
|---|---|---|---|---|
| 4,259,847 A * | 4/1981 | Pearse, Jr. | | F24F 1/02 236/1 E |
| 4,332,137 A * | 6/1982 | Hayes, Jr. | | F25B 13/00 62/151 |
| 4,676,072 A * | 6/1987 | Higuchi | | F25B 1/00 62/175 |
| 4,882,908 A * | 11/1989 | White | | F25B 13/00 165/233 |
| 4,887,436 A * | 12/1989 | Enomoto | | F25D 21/008 62/155 |
| 4,926,652 A * | 5/1990 | Kitamoto | | F25B 5/02 62/175 |
| 4,926,653 A * | 5/1990 | Masuda | | F25B 13/00 62/204 |
| 5,507,154 A * | 4/1996 | Grant | | F25D 21/006 62/151 |
| 5,797,729 A * | 8/1998 | Rafuse, Jr. | | F04B 49/20 417/3 |
| 5,953,926 A * | 9/1999 | Dressler | | F24F 3/147 236/44 C |
| 5,970,726 A * | 10/1999 | Derosier | | F25D 21/006 62/131 |
| 6,109,533 A * | 8/2000 | Ao | | F25B 13/00 165/240 |
| 6,293,119 B1 * | 9/2001 | Wenzel | | F24F 1/022 62/175 |
| 6,370,888 B1 * | 4/2002 | Grabon | | F04B 49/20 62/115 |
| 6,553,778 B2 * | 4/2003 | Tipton | | F25B 39/02 62/196.1 |
| 6,659,726 B2 * | 12/2003 | Holden | | F04B 41/06 417/2 |
| 6,978,630 B2 * | 12/2005 | Wensink | | B60H 1/00364 62/175 |
| 7,032,411 B2 * | 4/2006 | Hebert | | F25B 39/02 62/510 |
| 7,207,183 B2 * | 4/2007 | Crane | | F25B 49/025 417/2 |
| 7,661,274 B2 * | 2/2010 | Crane | | F25B 49/025 318/67 |
| 9,097,255 B2 * | 8/2015 | Kobayashi | | F04C 23/001 |
| 9,488,400 B2 * | 11/2016 | Him | | F25B 31/004 |
| 2004/0194491 A1 * | 10/2004 | Park | | F25B 43/006 62/275 |
| 2005/0172663 A1 * | 8/2005 | Dobmeier | | F25B 41/00 62/510 |
| 2005/0223724 A1 * | 10/2005 | Crane | | F25B 49/025 62/175 |
| 2006/0090483 A1 * | 5/2006 | Kim | | F24F 11/006 62/126 |
| 2007/0056300 A1 * | 3/2007 | Crane | | F25B 49/025 62/175 |
| 2008/0162077 A1 * | 7/2008 | Chang | | F24F 11/0009 702/182 |
| 2009/0084120 A1 * | 4/2009 | Meier | | B64F 1/362 62/129 |
| 2009/0219681 A1 * | 9/2009 | Goth | | F25B 49/02 361/679.53 |
| 2010/0107659 A1 * | 5/2010 | Hildreth, Jr. | | F25B 5/02 62/77 |
| 2010/0186433 A1 * | 7/2010 | Galante | | F04C 18/0215 62/115 |
| 2010/0236263 A1 * | 9/2010 | Park | | F24F 1/022 62/113 |
| 2011/0146314 A1 * | 6/2011 | Tamura | | F24F 11/008 62/228.5 |
| 2013/0098088 A1 * | 4/2013 | Lin | | F25B 49/02 62/228.1 |
| 2013/0104576 A1 * | 5/2013 | Lee | | F25B 13/00 62/80 |
| 2013/0274948 A1 * | 10/2013 | Matsuo | | F24F 11/02 700/300 |
| 2014/0013779 A1 * | 1/2014 | Cho | | F25D 11/02 62/56 |
| 2014/0214216 A1 * | 7/2014 | Kim | | F24F 11/0086 700/276 |
| 2014/0216068 A1 * | 8/2014 | Lee | | F25B 49/02 62/56 |
| 2014/0266755 A1 * | 9/2014 | Arensmeier | | F24F 11/0086 340/679 |
| 2015/0027139 A1 * | 1/2015 | Lin | | F25B 49/02 62/56 |
| 2015/0128618 A1 * | 5/2015 | Park | | F24F 3/065 62/56 |
| 2015/0267925 A1 * | 9/2015 | Inada | | F25B 13/00 62/509 |
| 2015/0345848 A1 * | 12/2015 | Him | | F25B 31/004 62/84 |

FOREIGN PATENT DOCUMENTS

| | | |
|---|---|---|
| JP | S61-195231 A | 8/1986 |
| JP | H2-267469 A | 11/1990 |
| JP | 07-332816 A | 12/1995 |
| JP | 09-287845 | 11/1997 |
| JP | H11-316040 A | 11/1999 |
| JP | 3073688 B | 6/2000 |
| JP | 2001-330291 A | 11/2001 |
| JP | 2005-042943 A | 2/2005 |
| JP | 2005-049022 A | 2/2005 |
| JP | 2005-300016 A | 10/2005 |
| JP | 2007-101126 A | 4/2007 |
| JP | 2010-014364 A | 1/2010 |
| JP | 2011-094903 A | 5/2011 |
| JP | 2011-202891 A | 10/2011 |
| JP | 2012-180996 A | 9/2012 |
| JP | 2012-207866 A | 10/2012 |
| JP | 2013-228130 A | 11/2013 |

OTHER PUBLICATIONS

Extended European Search Report dated May 20, 2016 in the corresponding EP application No. 15189918.4.

* cited by examiner

F I G. 5
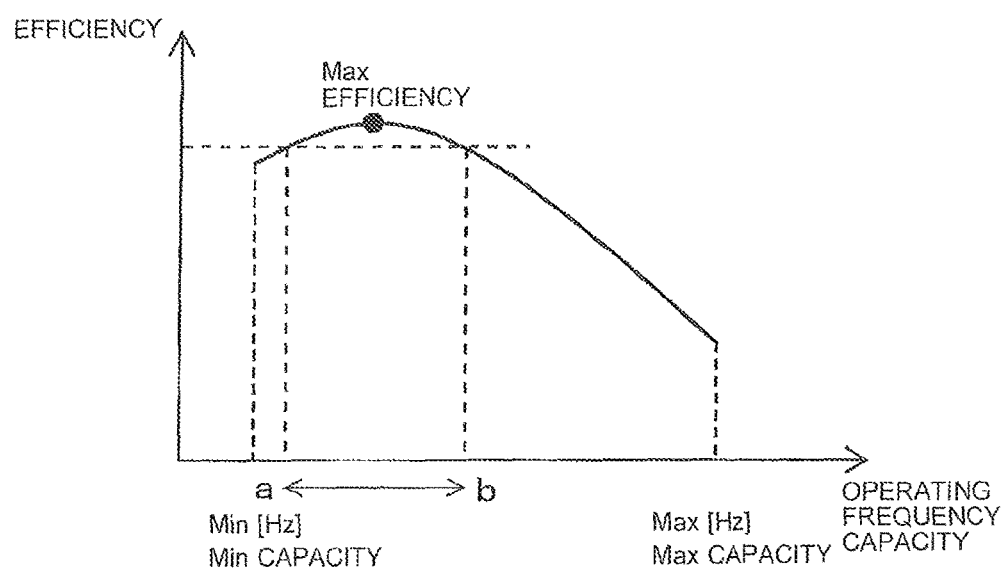

AIR-CONDITIONING SYSTEM USING CONTROL OF NUMBER OF COMPRESSORS BASED ON PREDETERMINED FREQUENCY RANGES

TECHNICAL FIELD

The present invention relates to an air-conditioning system including an air handling unit (hereinafter referred to as AHU).

BACKGROUND ART

An AHU generally has a configuration in which a heat exchanger coil is integrally incorporated in a main body casing (see, for example, Patent Literature 1). Then, during heating operation, hot water is allowed to pass through the heat exchanger coil, and fresh air is allowed to pass through the coil to generate hot air. Then, the hot air is blown out from a duct to each room in a construction by an air-sending device to heat the room. This type of air handling unit adopts a configuration in which the hot water generated by a boiler is used as a heat source, and then is allowed to flow through the heat exchanger coil.

Moreover, an air-conditioning system including a heat pump cycle including a compressor generally has the following problem. More specifically, when an air-conditioning load falls below a minimum capacity (operation at a minimum frequency of the compressor) of the heat pump cycle, in order to maintain an indoor temperature at a value set by a user, an on/off cycle operation (operation in which a start and a stop of operation are repeated) of the compressor becomes inevitable. Once in such a state of the on/off cycle operation, not only an operation efficiency as the heat pump cycle is low, but also there frequently cause a variation in pressure of a refrigerant circuit accompanying on/off switching and opening and closing of a relay contact of an electrical circuit. Therefore, life times of refrigerant circuit components, which include the compressor, and electrical circuit components may be shortened. In view of the above, as in Patent Literatures 2, 3, and 4, it has been proposed to include a plurality of compressors in the refrigerant circuit, and to control operating frequencies of the compressors based on the air-conditioning load to perform a highly-efficient operation.

CITATION LIST

Patent Literature

Patent Literature 1: Japanese Patent No. 3073688 (Page 2 and FIG. 1)
Patent Literature 2: Japanese Unexamined Patent Application Publication No. Hei 11-316040 (Abstract)
Patent Literature 3: Japanese Unexamined Patent Application Publication No. Hei 2-267469 (Page 2, Page 3, and FIG. 1 to FIG. 3)
Patent Literature 4: Japanese Unexamined Patent Application Publication No. Sho 61-195231 (FIG. 1)

SUMMARY OF INVENTION

Technical Problem

In Patent Literature 1, the heat exchanger coil is used as the heat source, but there is no discussion on using refrigerant of the heat pump cycle, which has been actively developed in recent years instead of the boiler, as the heat source.

In Patent Literatures 2, 3, and 4, a plurality of compressors are provided, and the compressors may be used selectively in an efficient manner to reduce the on/off cycle operation of the compressors at a time of a low load. However, when the configuration in which the plurality of compressors are provided is adopted, complicated refrigerant pipes and refrigerant circuit components tend to result in a high-cost product, and hence it is required to realize the configuration with low cost.

Moreover, the air-conditioning system of this type has an important problem of energy saving, and a further improvement in operation efficiency is required.

The present invention has been made in view of the above, and therefore has an object to provide a low-cost and highly-efficient air-conditioning system, which includes an AHU that uses refrigerant of a heat pump cycle as a heat source, and which is capable of reducing an on/off cycle operation of compressors at a time of a low load.

Solution to Problem

According to one embodiment of the present invention, there is provided an air-conditioning system, comprising: a plurality of outdoor units each including a compressor, a pressure-reducing device, and an outdoor heat exchanger; an air handling unit including a passage for exchanging air inside and outside a construction to perform ventilation, and an indoor heat exchanger through which the air inside the passage flows; a plurality of independent heat pump cycles formed by connecting the plurality of outdoor units and the air handling unit by refrigerant pipes, each of the plurality of independent heat pump cycles including the compressor, the indoor heat exchanger, the pressure-reducing device, and the outdoor heat exchanger; and a number control unit configured to control a number of the compressors to operate and an operating frequency of each of the compressors in operation, to satisfy a capacity demand corresponding to an air-conditioning load, based on particular frequency ranges associated with the respective compressors, the particular frequency ranges each defined to achieve a certain compressor efficiency or more.

Advantageous Effects of Invention

According to the one embodiment of the present invention, the low-cost and highly-efficient air-conditioning system, which includes the AHU that uses refrigerant of the heat pump cycle as a heat source, and which is capable of reducing an on/off cycle operation of the compressors at a time of a low load, may be provided.

BRIEF DESCRIPTION OF DRAWINGS

FIG. 5 is a graph showing a relationship between an operating frequency of a compressor and compressor efficiency.

DESCRIPTION OF EMBODIMENTS

Now, embodiments of the present invention are described. Note that, the present invention is not limited to the embodiments described below. Note that, in the following drawings, components denoted by the same reference symbols correspond to the same or equivalent components. This is common throughout the description herein. In addition, the forms of the components described herein are merely examples, and the components are not limited to the description herein.

Embodiment 1

Figure 1:
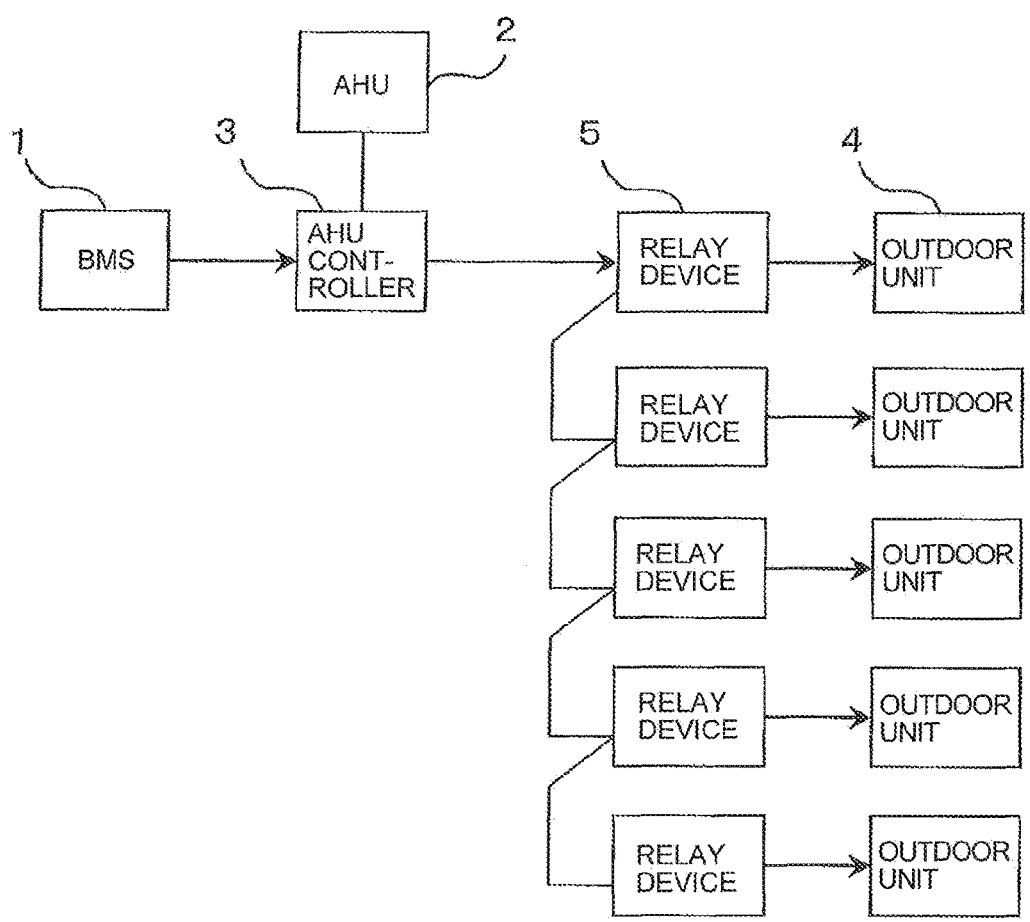
FIG. 1 is a system block diagram of an air-conditioning system according to Embodiment 1 of the present invention.
Figure 2:
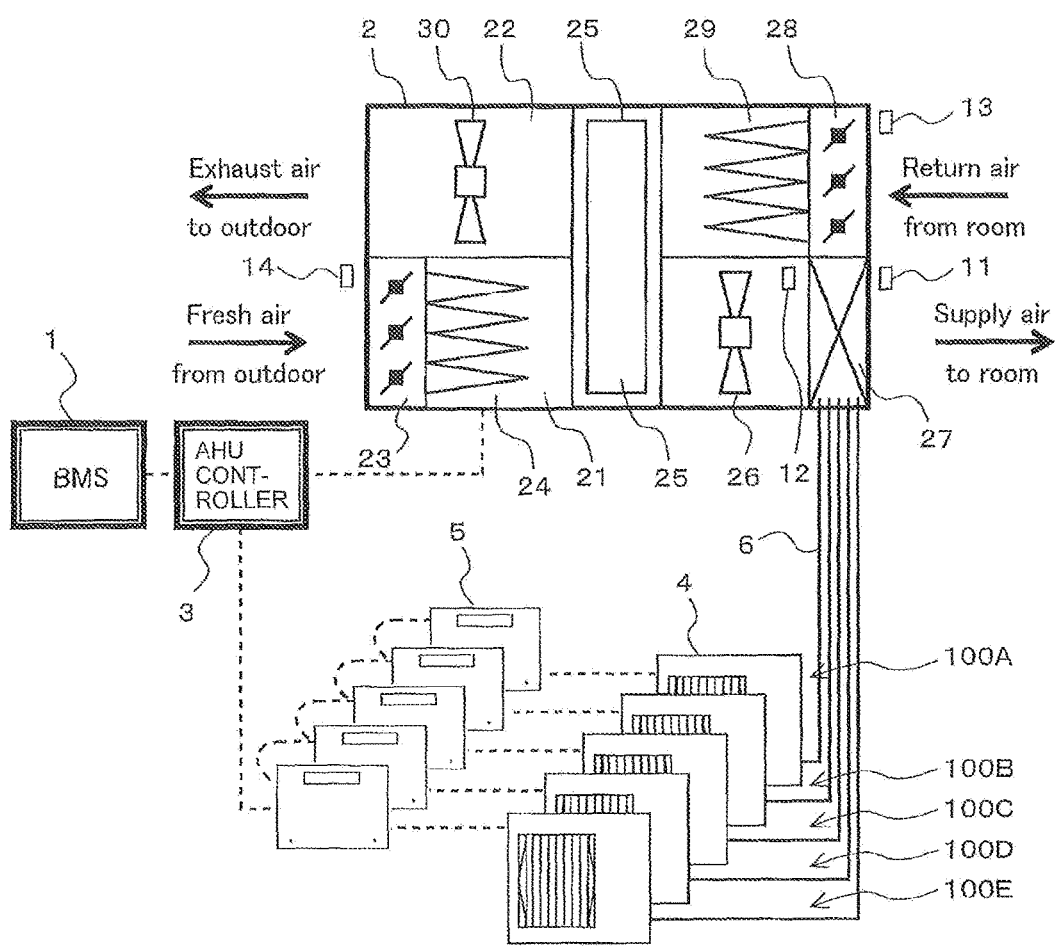
FIG. 2 is a conceptual diagram of the air-conditioning system according to Embodiment 1 of the present invention.
Figure 3:
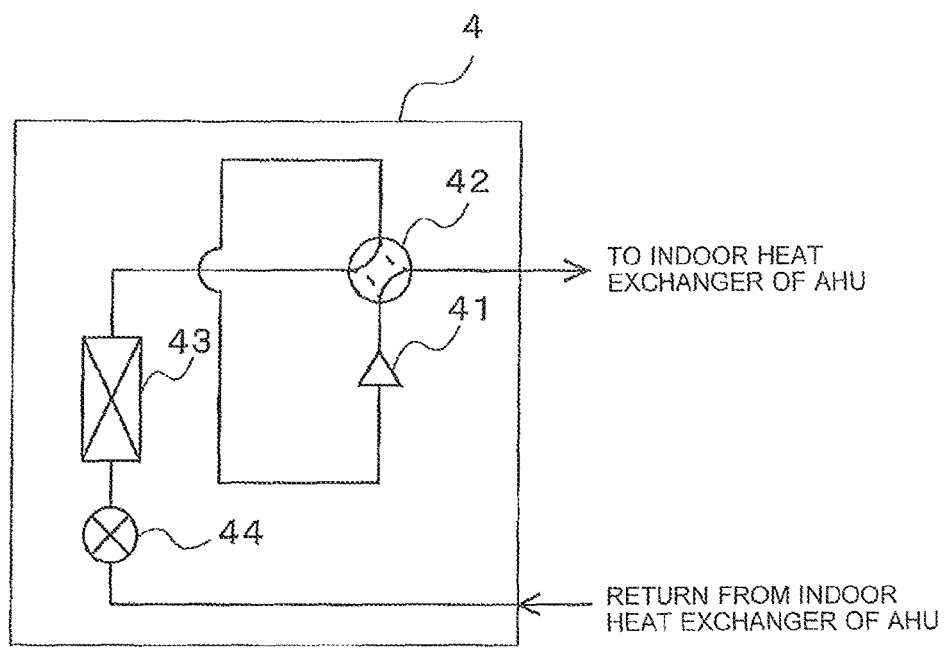
FIG. 3 is a diagram illustrating a configuration of an outdoor unit of FIG. 1.
Figure 4:
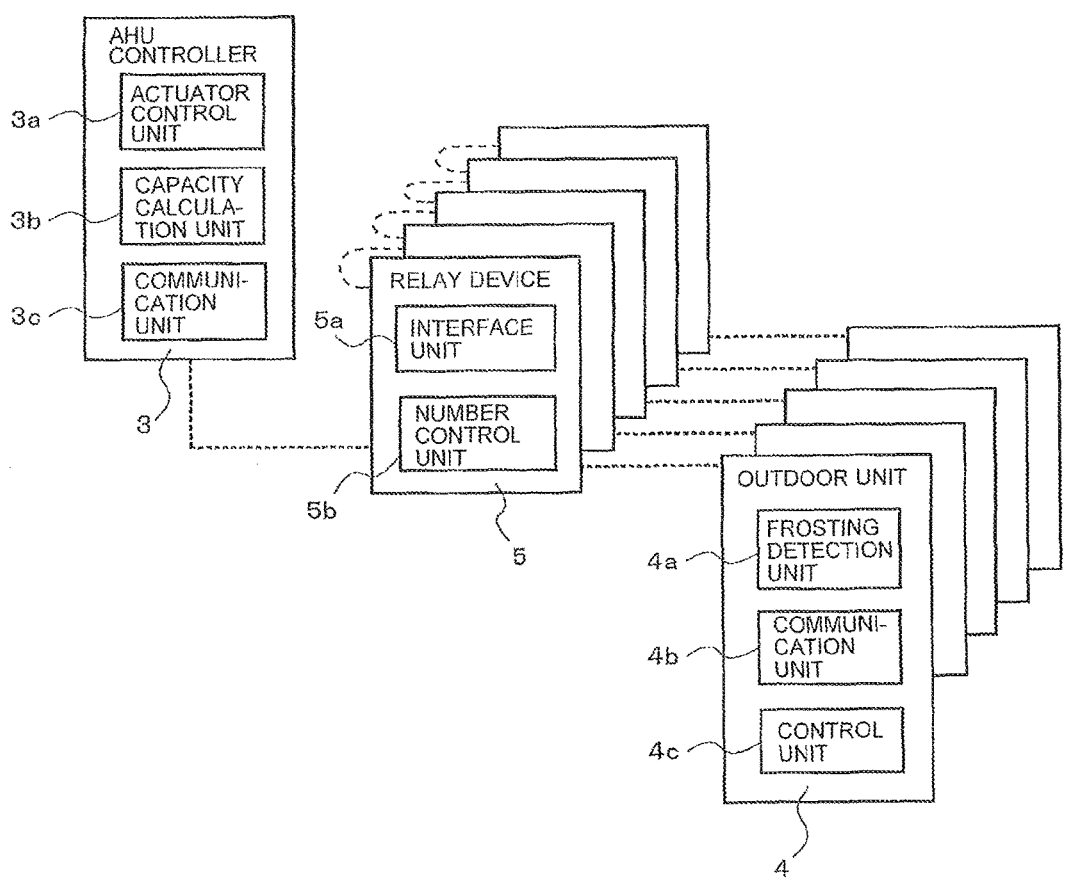
FIG. 4 is a block diagram illustrating functional components of the air-conditioning system according to Embodiment 1 of the present invention.

FIG. 1 is a system block diagram of an air-conditioning system according to Embodiment 1 of the present invention. FIG. 2 is a conceptual diagram of the air-conditioning system according to Embodiment 1 of the present invention. FIG. 3 is a diagram illustrating a configuration of an outdoor unit of FIG. 1. FIG. 4 is a block diagram illustrating functional components of the air-conditioning system according to Embodiment 1 of the present invention.

The air-conditioning system includes a building management system (hereinafter referred to as BMS) 1 for managing and controlling air conditioning of a building facility or other constructions, an AHU 2, an AHU controller 3 for controlling the AHU 2, a plurality of outdoor units 4, and a plurality of relay devices 5. The air-conditioning system in FIG. 1 exemplifies a system assuming a case where the BMS 1, the AHU 2 and the AHU controller 3, and the outdoor units 4 are products of mutually different manufacturers, and adopts a configuration in which, in order to allow information communication among the products of the different manufacturers, the same number of relay devices 5 as the number of outdoor units 4 are included.

Note that, in FIG. 1, the number of connected outdoor units 4 and the number of connected relay devices 5 are respectively five. However, the number of connected units/devices is arbitrary, and may be smaller than five. Alternatively, six or more units/devices may be connected. Moreover, the plurality of outdoor units 4 may adopt a configuration in which outdoor units of the same capacity are combined, or a configuration in which outdoor units of different capacities (for example, four compressors having 10 horsepower and one compressor having 5 horsepower) are combined.

The AHU 2 is a device for heating and cooling a room while exchanging air inside a construction and air outside the construction, and is installed in the construction such as an office, a building, a commercial facility, or a plant, for example. The AHU 2 includes, in a main body casing, a first passage 21 through which fresh air is supplied as supply air into the room, and a second passage 22 through which return air (indoor air) is discharged as exhaust air to the outside.

The first passage 21 includes a louver 23, a filter 24, an air heat exchanger 25 for exchanging heat between air flows, an air supply fan 26, and an indoor heat exchanger 27. Moreover, the second passage 22 includes a louver 28, a filter 29, the air heat exchanger 25, and an air exhaust fan 30. The air heat exchanger 25 in the first passage 21 and the air heat exchanger 25 in the second passage 22 are configured to be shared, and the air heat exchanger 25 is configured such that air passing through the first passage 21 and air passing through the second passage 22 exchange heat.

Moreover, the indoor heat exchanger 27 includes a plurality of independent refrigerant passages (not shown). Then, the refrigerant passages (not shown) are connected to the outdoor units 4 by refrigerant pipes 6, respectively, to form five independent heat pump cycles 100A to 100E (hereinafter collectively and simply referred to as "heat pump cycles 100") in this example. Refrigerant from the outdoor units 4 flows into the indoor heat exchanger 27, and the refrigerant and the air passing through the first passage 21 exchange heat. Note that, the indoor heat exchanger 27 is not limited to the above-mentioned configuration, and a configuration in which the same number of indoor heat exchangers 27 as the number of outdoor units 4 are included may be adopted.

The AHU 2 further includes an outlet air temperature sensor 11 for detecting an outlet air temperature of the supply air supplied from the first passage 21 to indoor space, a heat exchanger inlet temperature sensor 12 for detecting an air temperature at an inlet of the indoor heat exchanger 27, an in-construction temperature sensor 13 for detecting a temperature of space inside the air-temperature construction, and a fresh air temperature sensor 14. Temperatures detected by the outlet air temperature sensor 11, the in-construction temperature sensor 13, and the fresh air temperature sensor 14 are output to the AHU controller 3. Note that, the in-construction temperature sensor 13 may detect the outlet air temperature of the air that is blown out from the AHU 2 to the space inside the construction, a return air temperature of air that returns from the space inside the construction to the AHU 2, or the like, as long as a temperature inside the construction can be detected.

In the AHU 2 configured as described above, the fresh air that has flown into the first passage 21 passes through the louver 23 and the filter 24, then exchanges heat with the air passing through the second passage 22 in the air heat exchanger 25, and then flows into the indoor heat exchanger 27. The air that has flown into the indoor heat exchanger 27 exchanges heat with the refrigerant, and then is blown out to the space inside the construction. The air that has been blown out to the space inside the construction is supplied to each room through a duct (not shown), for example. On the other hand, the return air that has flown into the second passage 22 passes through the louver 28 and the filter 29, then exchanges heat with the air passing through the first passage 21 in the air heat exchanger 25, and then is discharged to the outside. Note that, the configuration of the AHU 2 is not limited to that of FIG. 2, and any configuration may be adopted as long as the AHU 2 includes at least a passage through which the air inside the construction and the air outside the construction are exchanged for ventilation, and the indoor heat exchanger through which the air inside the passage passes.

In this case, a refrigerant flow that passes through the indoor heat exchanger 27 is controlled by compressors 41 and expansion valves 44, which are provided in the outdoor units 4 and described later, and is adjusted so that air (supply air) to be supplied into the room becomes a desired temperature.

As illustrated in FIG. 3, the outdoor unit 4 includes a compressor 41 having an operating frequency that is variable by an inverter, a four-way valve 42, an outdoor heat exchanger 43, and an expansion valve 44 serving as a pressure-reducing device. Then, the compressor 41, the four-way valve 42, the outdoor heat exchanger 43, the expansion valve 44, and the indoor heat exchanger 27 of the AHU 2 are connected by a refrigerant pipe to form a refrigerant circuit of the heat pump cycle 100, through which the refrigerant circulates. The refrigerant circuit configured as described above is switched to a heating circuit or a cooling circuit by switching of the four-way valve 42. In the heating circuit, the outdoor heat exchanger 43 serves as an evaporator, the indoor heat exchanger 27 serves as a condenser, and hot air is supplied to the space inside the construction to heat the room. In the cooling circuit, the outdoor heat exchanger 43 serves as a condenser, the indoor heat exchanger 27 serves as an evaporator, and cold air is supplied to the space inside the construction to cool the room. Note that, the configuration of the refrigerant circuit is not limited to that illustrated in FIG. 3, and any configuration may be adopted as long as the refrigerant circuit at least includes the compressor 41, a heat exchanger serving as the condenser, the pressure-reducing device, and a heat exchanger serving as the evaporator.

As illustrated in FIG. 4, the outdoor unit 4 also includes a frosting detection unit 4a for detecting a frosting state of frost adhering to the outdoor heat exchanger 43 during a heating operation, a communication unit 4b, and a control unit 4c formed of a microcomputer or the like. The frosting detection unit 4a may adopt, for example, a configuration in which a light emitting element for irradiating the outdoor heat exchanger 43 with light, and a light receiving element for receiving reflected light from the outdoor heat exchanger 43 to output a voltage corresponding to the reflected light are included, or other such configuration that has hitherto been known.

The AHU controller 3 includes an actuator control unit 3a for controlling actuators for the air supply fan 26, the air exhaust fan 30, the louvers 23 and 28, and the like included in the AHU 2, a capacity calculation unit 3b, and a communication unit 3c.

The capacity calculation unit 3b calculates a required capacity in the AHU 2 corresponding to an air-conditioning load. The required capacity for the AHU 2 corresponds, in other words, to a required capacity in the outdoor units 4. The capacity calculation unit 3b does not calculate a required capacity for each of the outdoor units 4, but calculates a total required capacity for all the outdoor units 4. More specifically, the capacity calculation unit 3b calculates, based on a temperature difference $\Delta T$ between the outlet air temperature detected by the outlet air temperature sensor 11 and a set temperature that is set in advance, a total required capacity [kW] that is required to make the room reach the set temperature. The capacity calculation unit 3b further calculates a proportion (0% to 100%) of the total required capacity to a total capacity [kW] of all the outdoor units 4, and generates a capacity demand for requesting a capacity of the proportion from the AHU 2, that is, from the outdoor units 4.

The communication unit 3c performs processing relating to communication to/from the relay devices 5 and the BMS 1, such as transmitting an air-conditioning request (0% to 100%) from the BMS 1 to the relay devices 5, and transmitting the capacity demand generated by the capacity calculation unit 3b to the relay devices 5. Note that, the temperature difference $\Delta T$ may be a temperature difference between the temperature of the return air from the indoor space to the AHU 2 or the temperature inside the construction and the set temperature.

The AHU controller 3 may be formed of hardware such as a circuit device for realizing the function thereof, or may be formed of an arithmetic unit such as a microcomputer or a CPU, and software executed thereon.

Moreover, the relay device 5 includes an interface unit 5a for enabling the information communication between the products of different manufacturers, and a number control unit 5b. The number control unit 5b is described later.

Meanwhile, the present invention has a problem of reducing an on/off cycle operation of the compressors 41 at a time of a low load. In order to solve this problem, a number control of controlling the number of compressors 41 in operation and the operating frequencies in response to the capacity demand for the outdoor units 4 is performed.

In Embodiment 1, the number control is performed by the relay devices 5. Note that, in FIG. 2, the configuration in which the relay devices 5 are respectively connected to the outdoor units 4 is adopted, and hence each of the relay devices 5 performs the following computation. More specifically, the relay device 5 first acquires various kinds of information such as connected outdoor unit model information (information on capacity and performance), the number of connected outdoor units, and the like from the AHU controller 3, and generates, based on the acquired information, number control information defining a relationship among a total operating frequency of the compressors 41, the number of compressors 41 in operation, and the operating frequency of each of the compressors 41 in operation.

Then, each of the relay devices 5 determines, based on the capacity demand from the AHU controller 3 and on the number control information, a timing at which operation of each of the compressors 41 is required, to thereby control the number of compressors 41 in operation and the operating frequencies. In this case, the configuration in which the relay devices 5 are respectively provided for the outdoor units 4 is adopted, and hence each of the relay devices 5 is configured to transmit, when the timing at which the operation of the compressor 41 connected thereto is required arrives, an operation instruction containing the operating frequency to the compressor 41 connected thereto. Those operations in the relay device 5 are performed by the number control unit 5b.

The number control unit 5b of the relay device 5 may be formed of hardware such as a circuit device for realizing the function thereof, or may be formed of an arithmetic unit such as a microcomputer or a CPU, and software executed thereon.

Next, the number control capable of reducing the on/off cycle operation of the compressors 41 at the time of the low load and of realizing high efficiency is described.

FIG. 5 is a graph showing a relationship between the operating frequency of the compressor and compressor efficiency. In FIG. 5, "Min [Hz]" indicates a minimum possible frequency of the device, and "Max [Hz]" indicates a maximum possible frequency of the device.

As shown in FIG. 5, the compressor generally has an operating frequency at which efficiency becomes Max, and has a characteristic that efficiency is reduced as the compressor becomes further away from the operating frequency. In other words, a particular frequency range (range of a-b in FIG. 5) in which certain compressor efficiency or more is obtained is predetermined, and outside the particular frequency range, the efficiency is reduced. Therefore, in order to realize efficient operation, it is important not to reduce or increase the operating frequency too much. Therefore, in Embodiment 1, the number of compressors 41 in operation and the operating frequencies are controlled based on the particular frequency range associated with the compressor 41, in which the certain compressor efficiency or more is obtained, to realize the high efficiency.

Figure 6:
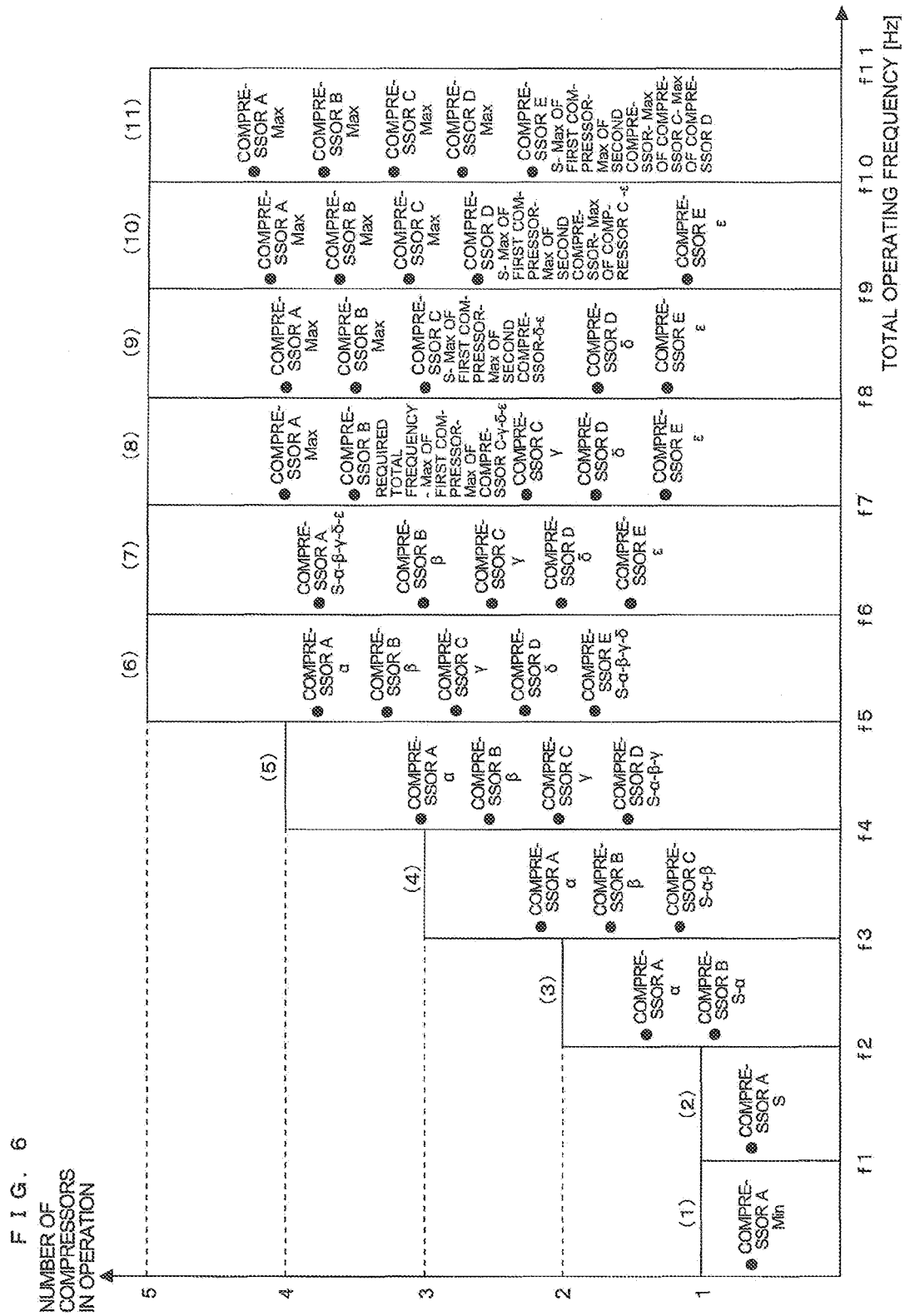
FIG. 6 is an explanatory graph of number control information in the air-conditioning system according to Embodiment 1 of the present invention.

FIG. 6 is an explanatory graph of the number control information in the air-conditioning system according to Embodiment 1 of the present invention. In FIG. 6, the horizontal axis indicates the total operating frequency of the compressors 41, and the vertical axis indicates the number of compressors 41 in operation. In FIG. 6, the operating frequencies of the compressors 41 in each range obtained by dividing the total operating frequency into a plurality of (here, eleven) ranges are also shown. Note that, for convenience of the description, five compressors 41 are hereinafter distinguished as a compressor A, a compressor B, a compressor C, a compressor D, and a compressor E as necessary.

As described above, the compressors 41 have a predetermined particular frequency range in which the compressor efficiency becomes certain high efficiency or more. Therefore, in order to realize the effective operation, it is important not to increase the operating frequencies of the individual compressors 41 too much even if the capacity demand for the AHU 2 is high. In other words, in the number control, for example, when the operating frequency of the first compressor 41 is increased to some extent, the operating frequency is maintained without being further increased, and the second and subsequent compressors 41 are operated. Note that, each of $\alpha$, $\beta$, $\gamma$, $\delta$, and $\varepsilon$ is the maximum operating frequency in the particular frequency range in which the certain compressor efficiency or more is obtained in the compressors A, B, C, D, and E, respectively, and corresponds to "b" in FIG. 5. Moreover, "Min [Hz]" is the minimum possible frequency of the device, and "Max [Hz]" is the maximum possible frequency of the device. Note that, "the particular frequency range associated with the compressor, in which the certain compressor efficiency or more is obtained," is within the connected outdoor unit model information.

Total operating frequencies f1 to f11 in FIG. 6 are as follows.

f1: Min [Hz] of the compressor A f2: $\alpha$ [Hz] of the compressor A f3: $\alpha$ [Hz] of the compressor A+$\beta$ [Hz] of the compressor B f4: $\alpha$ [Hz] of the compressor A+$\beta$ [Hz] of the compressor B+$\gamma$ [Hz] of the compressor C f5: $\alpha$ [Hz] of the compressor A+$\beta$ [Hz] of the compressor B+$\gamma$ [Hz] of the compressor C+$\delta$ [Hz] of the compressor D f6: $\alpha$ [Hz] of the compressor A+$\beta$ [Hz] of the compressor B+$\gamma$ [Hz] of the compressor C+$\delta$ [Hz] of the compressor D+$\varepsilon$ [Hz] of the compressor E f7: Max [Hz] of the compressor A+$\beta$ [Hz] of the compressor B+$\gamma$ [Hz] of the compressor C+$\delta$ [Hz] of the compressor D+$\varepsilon$ [Hz] of the compressor E f8: Max [Hz] of the compressor A+Max [Hz] of the compressor B+$\gamma$ [Hz] of the compressor C+$\delta$ [Hz] of the compressor D+$\varepsilon$ [Hz] of the compressor E f9: Max [Hz] of the compressor A+Max [Hz] of the compressor B+Max [Hz] of the compressor C+$\delta$ [Hz] of the compressor D+$\varepsilon$ [Hz] of the compressor E f10: Max [Hz] of the compressor A+Max [Hz] of the compressor B+Max [Hz] of the compressor C+Max [Hz] of the compressor D+$\varepsilon$ [Hz] of the compressor E f11: Max [Hz] of the compressor A+Max [Hz] of the compressor B+Max [Hz] of the compressor C+Max [Hz] of the compressor D+Max [Hz] of the compressor E (=capacity demand 100%)

As shown in FIG. 6, a total operating frequency S is divided into the eleven ranges, and details of controls (1) to (11) in the respective ranges are described below.

The control (1) is selected when a required total operating frequency S is equal to or higher than 0 and less than f1, and the compressor A is operated at Min [Hz].

The control (2) is selected when the required total operating frequency S is equal to or higher than f1 and less than f2. More specifically, the compressor A is operated at S [Hz].

The control (3) is selected when the required total operating frequency S is equal to or higher than f2 and less than f3. More specifically, the compressor A is operated at $\alpha$ [Hz], and the compressor B is operated at S-$\alpha$ [Hz] (where S-$\alpha$ [Hz] falls within a range of from the minimum frequency to $\beta$ [Hz]).

The control (4) is selected when the required total operating frequency S is equal to or higher than f3 and less than f4. More specifically, the compressor A is operated at $\alpha$ [Hz], the compressor B is operated at $\beta$ [Hz], and the compressor C is operated at S-$\alpha$-$\beta$ [Hz] (where S-$\alpha$-$\beta$ [Hz] falls within a range of from the minimum frequency to $\gamma$ [Hz]).

The control (5) is selected when the required total operating frequency S is equal to or higher than f4 and less than f5. More specifically, the compressor A is operated at $\alpha$ [Hz], the compressor B is operated at $\beta$ [Hz], the compressor C is operated at $\gamma$ [Hz], and the compressor D is operated at S-$\alpha$-$\beta$-$\gamma$ [Hz] (where S-$\alpha$-$\beta$-$\gamma$ [Hz] falls within a range of from the minimum frequency to $\delta$ [Hz]).

The control (6) is selected when the required total operating frequency S is equal to or higher than f5 and less than f6. More specifically, the compressor A is operated at $\alpha$ [Hz], the compressor B is operated at $\beta$ [Hz], the compressor C is operated at $\gamma$ [Hz], the compressor D is operated at $\delta$ [Hz], and the compressor E is operated at S-$\alpha$-$\beta$-$\gamma$-$\delta$ [Hz] (where S-$\alpha$-$\beta$-$\gamma$-$\delta$ [Hz] falls within a range of from the minimum frequency to $\varepsilon$ [Hz]).

The control (7) is selected when the required total operating frequency S is equal to or higher than f6 and less than f7. More specifically, the compressor A is operated at S-$\beta$-$\gamma$-$\delta$-$\varepsilon$ [Hz] (where S-$\beta$-$\gamma$-$\delta$-$\varepsilon$ [Hz] falls within a range of from the minimum frequency to $\alpha$ [Hz]), the compressor B is operated at $\beta$ [Hz], the compressor C is operated at $\gamma$ [Hz], the compressor D is operated at $\delta$ [Hz], and the compressor E is operated at $\varepsilon$ [Hz].

The control (8) is selected when the required total operating frequency S is equal to or higher than f7 and less than f8. More specifically, the compressor A is operated at Max [Hz], the compressor B is operated at S-(Max [Hz] of the compressor A)-$\gamma$-$\delta$-$\varepsilon$ [Hz] (where S-(Max [Hz] of the compressor A)-$\gamma$-$\delta$-$\varepsilon$ [Hz] falls within a range of from $\beta$ [Hz] to Max [Hz]), the compressor C is operated at $\gamma$ [Hz], the compressor D is operated at $\delta$ [Hz], and the compressor E is operated at $\varepsilon$ [Hz].

The control (9) is selected when the required total operating frequency S is equal to or higher than f8 and less than f9. More specifically, the compressor A is operated at Max [Hz], the compressor B is operated at Max [Hz], the compressor C is operated at S-(Max [Hz] of the compressor A)-(Max [Hz] of the compressor B)-δ-ε [Hz] (where S-(Max [Hz] of the compressor A)-(Max [Hz] of the compressor B)-δ-ε [Hz] falls within a range of from γ [Hz] to Max [Hz]), the compressor D is operated at δ [Hz], and the compressor E is operated at ε [Hz].

The control (10) is selected when the required total operating frequency S is equal to or higher than f9 and less than f10. More specifically, the compressor A is operated at Max [Hz], the compressor B is operated at Max [Hz], the compressor C is operated at Max [Hz], the compressor D is operated at S-(Max [Hz] of the compressor A)-(Max [Hz] of the compressor B)-(Max [Hz] of the compressor C)-ε [Hz] (where S-(Max [Hz] of the compressor A)-(Max [Hz] of the compressor B)-(Max [Hz] of the compressor C)-ε [Hz] falls within a range of from δ [Hz] to Max [Hz]), and the compressor E is operated at ε [Hz].

The control (11) is selected when the required total operating frequency S is equal to or higher than f10 and less than f11. More specifically, the compressor A is operated at Max [Hz], the compressor B is operated at Max [Hz], the compressor C is operated at Max [Hz], the compressor D is operated at Max [Hz], and the compressor E is operated at S-(Max [Hz] of the compressor A)-(Max [Hz] of the compressor B)-(Max [Hz] of the compressor C)-(Max [Hz] of the compressor D) [Hz] (where S-(Max [Hz] of the compressor A)-(Max [Hz] of the compressor B)-(Max [Hz] of the compressor C)-(Max [Hz] of the compressor D) [Hz] falls within a range of from ε [Hz] to Max [Hz]).

As described above, in satisfying the capacity demand, the number control unit 5b is configured to, when the required total operating frequency required for the compressors 41 is within the particular frequency range, operate one compressor 41, and when the required total operating frequency is not within the particular frequency range, sequentially increase the number of compressors 41 in operation so that each of the operating frequencies of the respective compressors 41 is within the particular frequency range. Then, when the capacity demand cannot be satisfied even when all the compressors 41 are operated in the particular frequency range, the number control in which the number of compressors 41 that operate at the maximum operating frequency Max is increased while sequentially decreasing the number of compressors 41 having the operating frequencies that are within the particular frequency range is performed.

Note that, in the number control described above, the order of priority in operating the compressors 41 has been: "the compressor A">"the compressor B">"the compressor C">"the compressor D">"the compressor E", but in order to equalize operation time of the compressors 41, ones of the same model of the compressor A to the compressor E are always interchanged. In other words, the compressors 41 to be operated are selected so that the compressors 41 are preferentially operated in order of increasing operation time. It should be noted, however, that a compressor having a smaller capacity of the outdoor unit 4 needs to be given higher priority in operation. This is done in order to satisfy a request for lower capacity.

Figure 7:
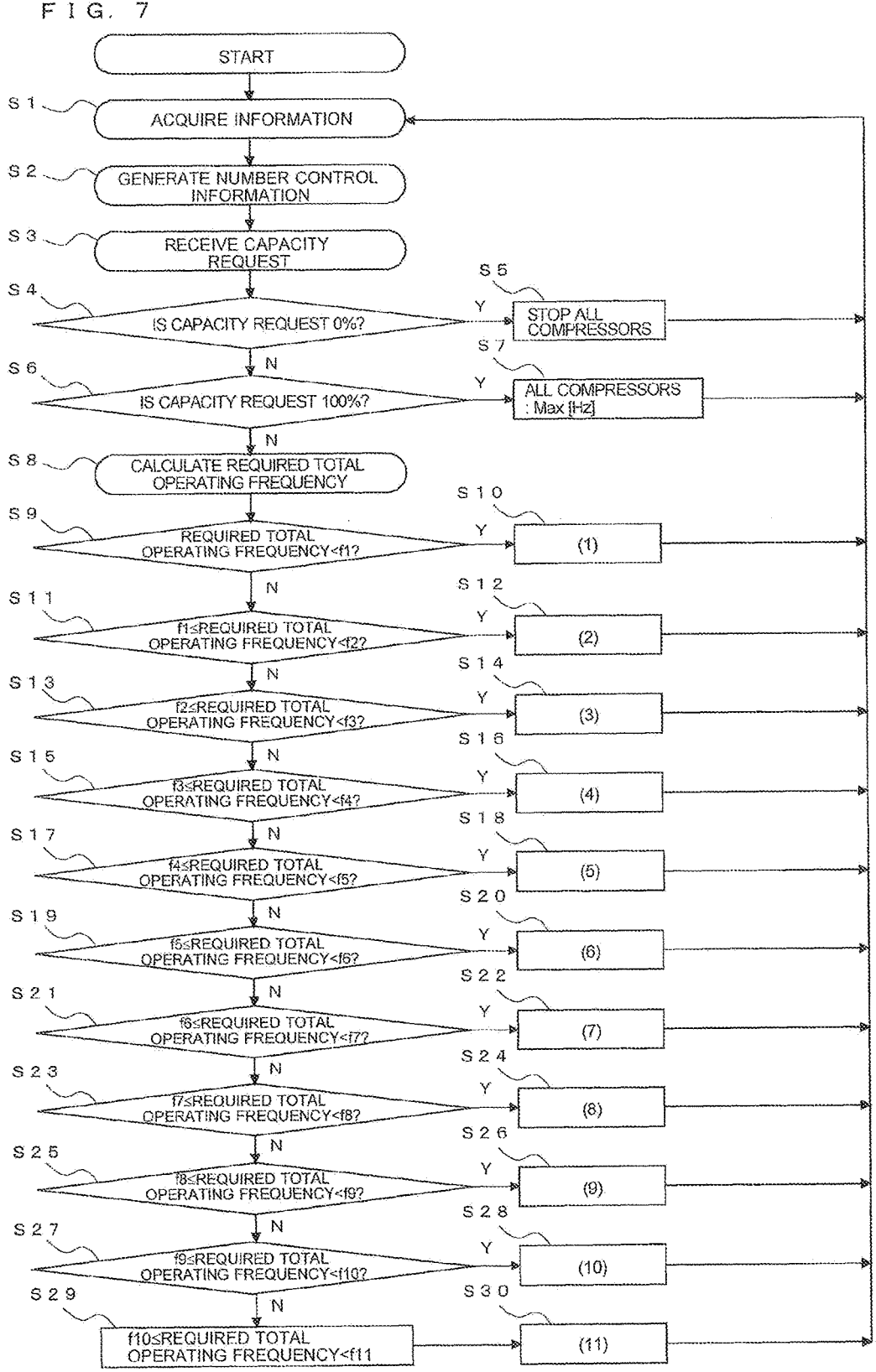
FIG. 7 is a flow chart illustrating a flow of processing in the air-conditioning system according to Embodiment 1 of the present invention.
Figure 8:
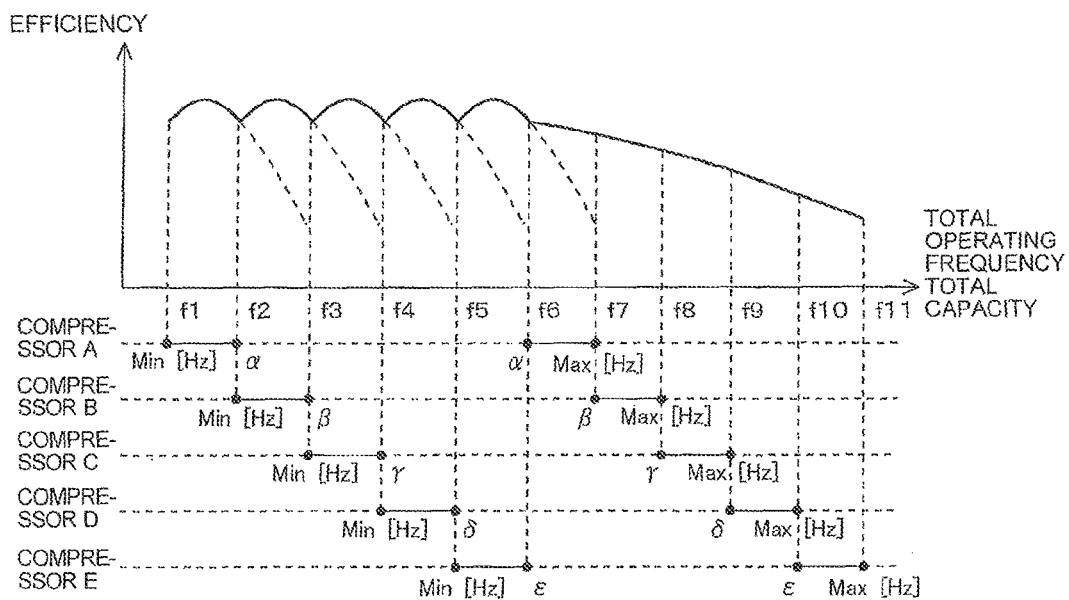
FIG. 8 is a graph showing a number control operation efficiency characteristic under certain conditions (fresh air temperature and return air temperature) in the air-conditioning system according to Embodiment 1 of the present invention.

FIG. 7 is a flow chart illustrating a flow of processing in the air-conditioning system according to Embodiment 1 of the present invention. FIG. 8 is a graph showing a number control operation efficiency characteristic under certain conditions (fresh air temperature and return air temperature) in the air-conditioning system according to Embodiment 1 of the present invention. Now, an operation of switching on/off the operation of the compressors and a control of operating frequencies of the compressors are described following the flow chart illustrated in FIG. 7. The controls (1) to (11) in FIG. 7 correspond to the controls (1) to (11) in FIG. 6, respectively.

First, in Step S1, the relay device 5 acquires, based on setting information from a remote control connectable to the relay device 5, communication information from the outdoor units 4, and the like, the connected outdoor unit model information (capacity characteristic and performance characteristic), and the number of connected outdoor units. Then, the relay device 5 proceeds to Step S2.

In Step S2, the number control unit 5b of the relay device 5 generates the number control information as shown in FIG. 6 based on the information obtained in Step S1, and proceeds to Step S3. Note that, in Step S1, the relay device 5 may further acquire, based on information from temperature sensors 11 to 14 and the like, the fresh air temperature, information on inlet air temperature of the indoor heat exchanger 27, operation states of the outdoor units (whether or not the outdoor units are in a defrosting operation), the frosting state of the outdoor heat exchanger 43, and other such information. Those pieces of information are utilized to calculate the required total operating frequency S in Step S8, which is to be described later. Note that, in this example, the number control unit 5b generates the number control information as shown in FIG. 6 based on the information obtained in Step S1, but number control information that has been generated separately in advance may be stored in the number control unit 5b.

In Step S3, the relay device 5 receives the capacity demand from the AHU controller 3, and proceeds to Step S4.

In Step S4, the relay device 5 determines whether the capacity demand received from the AHU controller 3 is 0%. When the capacity demand is 0%, the relay device 5 proceeds to Step S5 to stop all of the connected compressors 41, and then returns back to Step S1. When the capacity demand is not 0%, the relay device 5 proceeds to Step S6.

In Step S6, the relay device 5 determines whether the capacity demand received from the AHU controller 3 is 100%. When the capacity demand is 100%, the relay device 5 proceeds to Step S7 to cause all of the connected compressors 41 to operate at the maximum operating frequency Max, and then returns back to Step S1. When the capacity demand is not 100%, the relay device 5 proceeds to Step S8.

In Step S8, the relay device 5 calculates the required total operating frequency S of the connected compressors 41 (five compressors: A, B, C, D, and E in FIG. 8) for satisfying the capacity demand together with the information acquired in Step S1, and proceeds to Step S9.

In Step S9 to Step S30, depending on which of the eleven ranges obtained by dividing the range of the operating frequencies 0 to f11 the required total operating frequency S corresponds to, one of the controls (1) to (11) shown in FIG. 6 is performed.

Figure 9:
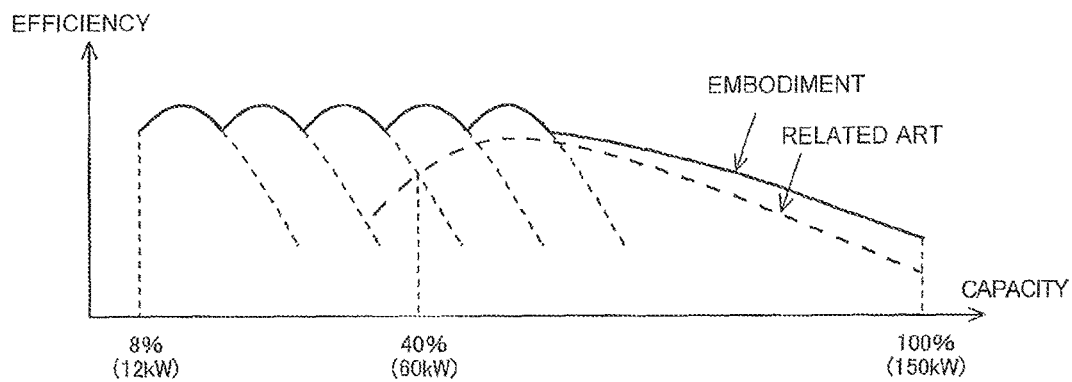
FIG. 9 is a graph showing a capacity-efficiency characteristic of the air-conditioning system according to Embodiment 1 of the present invention.

FIG. 9 is a graph showing a capacity-efficiency characteristic of the air-conditioning system according to Embodiment 1 of the present invention. In FIG. 9, the related art is indicated by the dotted line for comparison. The graph of this embodiment indicated by the solid line specifically indicates a capacity-efficiency characteristic in a configuration in which five outdoor units 4 having a maximum capacity of 30 [kW] and a minimum capacity that is 40% of the maximum capacity (12 [kW]) are connected to the AHU 2 having a maximum capacity of 150 [kW]. Moreover, the graph of the related art indicated by the dotted line specifically indicates a capacity-efficiency characteristic in a configuration in which one outdoor unit having a maximum capacity of 150 [kW] and a minimum capacity that is 40% of the maximum capacity (60 [kW]) is connected to the AHU having the maximum capacity of 150 [kW]. In other words, this embodiment indicated by the solid line indicates the capacity-efficiency characteristic in an air-conditioning system including a plurality of outdoor units having small capacities, and the related art indicated by the dotted line indicates the capacity-efficiency characteristic in an air-conditioning system including one outdoor unit having a large capacity.

In the related-art configuration, a minimum value of a capacity accommodated in continuous operation without the compressor performing the on/off cycle operation is 60 [kW], which is the minimum capacity of the compressor. In other words, when the required capacity required for the compressor is smaller than 60 [kW], which is smaller than the minimum capacity of the compressor, the compressor becomes overcapacity when continuously operated, and hence the compressor performs the on/off cycle operation.

In reducing such on/off cycle operation, in Embodiment 1, instead of the configuration including the one compressor having the large capacity, the configuration including the plurality of compressors 41 to cover the large capacity is adopted. Then, as described above, when the required capacity is low (12 [kW] in the example of FIG. 9), only one compressor 41 is driven, and as the required capacity becomes higher, the operating frequency of the compressor 41 is increased, and the number of compressors 41 in operation is increased.

In the configuration of Embodiment 1, a minimum value of the required capacity accommodated in continuous operation without the compressor 41 performing the on/off cycle operation is 12 [kW], which is the minimum capacity of the compressor 41. In other words, when the air-conditioning system is seen as a whole, the related-art configuration starts the on/off cycle operation with the required capacity of 60 [kW], but the configuration of Embodiment 1 enables the continuous operation (stable operation) down to the capacity demand of 8% (=(12/150)×100) without the compressor 41 performing the on/off cycle operation.

Reference is also made to FIG. 9 focusing on the efficiency. It is generally known that the compressor has lower operation efficiency as the operating frequency is in a higher range, and in FIG. 9 also, the related art indicated by the dotted line shows such tendency. On the other hand, in this embodiment, when the capacity demand is high, the number of compressors 41 in operation is increased so that each of the compressors 41 in operation is operated at an efficient operating frequency. Therefore, as indicated by the solid line, it can be seen that the operation efficiency is superior to the related art.

Meanwhile, when the outdoor heat exchanger 43 is frosted while the AHU 2 is performing the heating operation, the defrosting operation is performed. The defrosting operation is performed by switching the four-way valve 42 to change the refrigerant circuit from the heating circuit to the cooling circuit and cause high-temperature refrigerant discharged from the compressor 41 to flow through the outdoor heat exchanger 43. The defrosting operation is repeatedly performed during the heating operation. The compressor 41 that has entered the defrosting operation generates a negative capacity, and in order to cover the negative capacity, the relay device 5 increases the required total operating frequency S, operates a compressor 41 that has been stopped, and increases the operating frequencies of the compressors 41 in operation to suppress a feeling of cold air due to the defrosting operation.

More specifically, for example, an operation state in which the total required capacity for the AHU 2 is 60 [kW], three of the five compressors 41 are in the stable operation at the capacity of 20 [kW], and two of the five compressors 41 are stopped is assumed. Then, in this operation state, a case where one compressor 41 enters the defrosting operation, and the capacity of the compressor 41 becomes −20 kW is considered. In this case, both the two compressors 41 that have been stopped may be started to be operated at 20 kW to satisfy the total required capacity of 60 [kW].

Moreover, in performing the defrosting operation, when a plurality of heat pump cycles 100 become cooling circuits at the same time, the room may not reach the set temperature, and a claim about coldness may be made. In order to prevent such situation, in Embodiment 1, the number of compressors to start the defrosting operation is restricted as appropriate based on the number of outdoor heat exchangers 43 that need the defrosting operation. More specifically, for example, the start of the defrosting operation is caused to wait as appropriate to perform the defrosting operation for a small number of (for example, one or two) outdoor heat exchangers 43 at a time. This may minimize the risk of the claim about the coldness due to the defrosting operation.

For the above-mentioned number control at the time of the defrosting operation, the outdoor unit 4 and the relay device 5 specifically perform the following processing. More specifically, the outdoor unit 4 detects the frosting state of the outdoor heat exchanger 43 thereof with the frosting detection unit 4a. Then, the outdoor unit 4 transmits a detection result to the number control unit 5b of the relay device 5 to which the outdoor unit 4 is connected. More specifically, when detecting that the frosting state detected by the frosting detection unit 4a has reached a limit of the frosting state in which a desired heating capacity can be maintained, the outdoor unit 4 transmits a detection result to the effect that there is a need to start the defrosting operation to the relay device 5 to which the outdoor unit 4 is connected before the defrosting operation is started. Then, the outdoor unit 4 waits for an instruction to start the operation from the relay device 5 before starting the defrosting operation.

The number control unit 5b on the side of the relay device 5 that has received the detection result from the outdoor unit 4 determines, in cooperation with the other relay devices 5 and taking the detection result from each of the outdoor units 4 into consideration, a timing to start the defrosting operation for each of the outdoor heat exchangers 43. Then, when it is the timing to start the defrosting operation for the outdoor heat exchanger 43 connected to the relay device 5, the relay device 5 starts the defrosting operation.

Note that, in Embodiment 1, because the configuration in which the relay device 5 is provided for each of the outdoor units 4, and in which a plurality of number control unit 5b are included in the air-conditioning system is adopted, the above-mentioned control is performed, but it should be understood that the number control units 5b may be integrated so that one number control unit 5b centrally performs the number control at the time of the defrosting operation for all the outdoor units 4.

As described above, the air-conditioning system according to Embodiment 1 includes the plurality of compressors 41 to perform the number control of controlling the number of compressors 41 in operation and the operating frequencies in response to the capacity demand. This enables the reduction of the on/off cycle operation of the compressors 41 at the time of the low load, and increases in life time and efficiency accompanying the reduction of the on/off cycle operation of the compressors 41.

Moreover, each of the heat pump cycles 100 is configured to include one compressor 41. Therefore, the air-conditioning system may be constructed by adopting a configuration in which an outdoor unit having the same specifications as in a normal air conditioner (outdoor unit including one compressor) is used for the outdoor unit 4 including the compressor 41, the expansion valve 44, and the outdoor heat exchanger 43, and in which a plurality of the outdoor units are connected. Therefore, there is no need to newly develop an outdoor unit for such a complicated refrigerant circuit as to include a plurality of compressors 41, and hence the air-conditioning system may be constructed with low cost.

Embodiment 2

Figure 10:
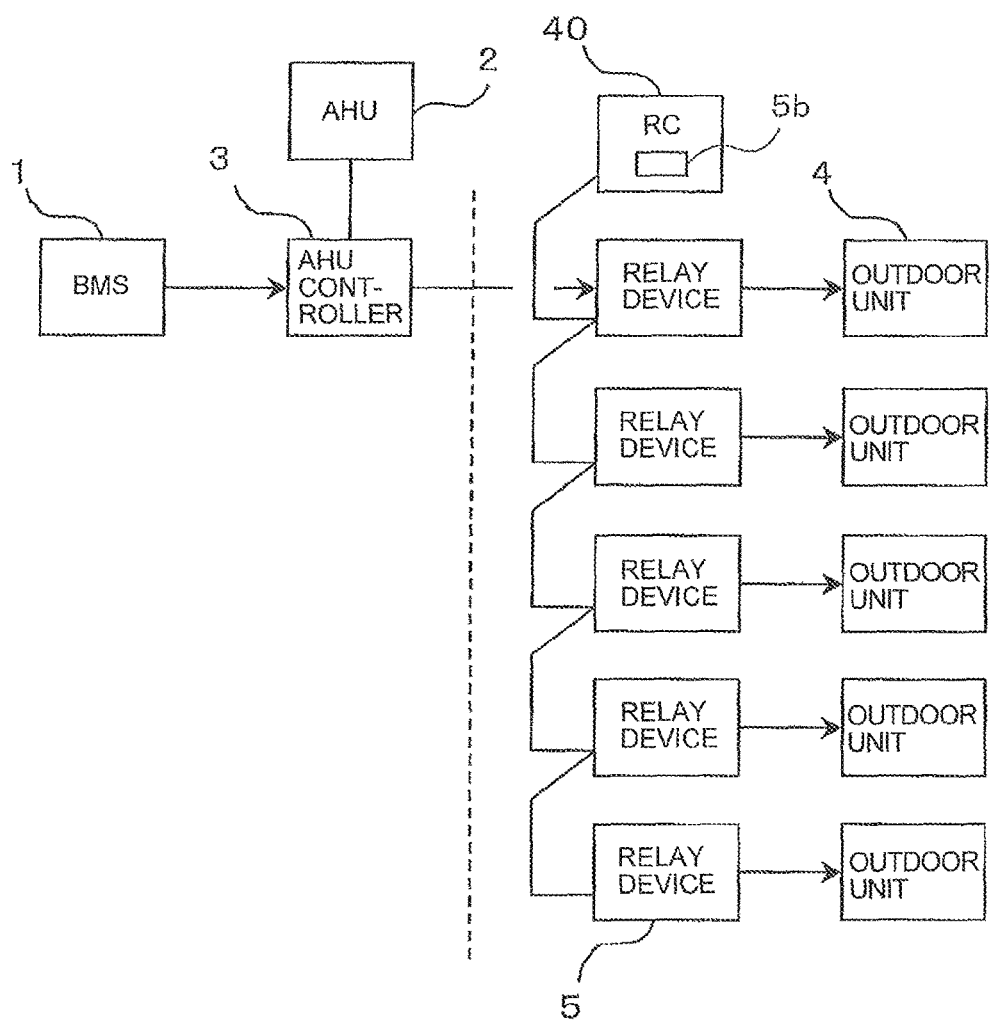
FIG. 10 is a system block diagram of an air-conditioning system according to Embodiment 2 of the present invention.

FIG. 10 is a system block diagram of an air-conditioning system according to Embodiment 2 of the present invention. Embodiment 2 adopts a configuration in which a remote control 40 includes the above-mentioned number control unit 5b. More specifically, the generation of the number control information, the operation of switching on/off the operation of each of the compressors 41, and the control on the operating frequencies of the compressors, which have been mainly performed by the relay devices 5 in Embodiment 1, are performed by the remote control 40, and basic concepts are similar to those of Embodiment 1. The remote control 40 is connected to the relay devices 5. The remote control 40 specifically corresponds, for example, to a remote control used by an air-conditioning system installer or a facility manager for initial setting. Note that, a modified example applied in the configuration of Embodiment 1 may equally be applied to similar components in Embodiment 2. The same is true for the following embodiments.

With the air-conditioning system according to Embodiment 2, similar effects as those of Embodiment 1 may be obtained.

Embodiment 3

Figure 11:
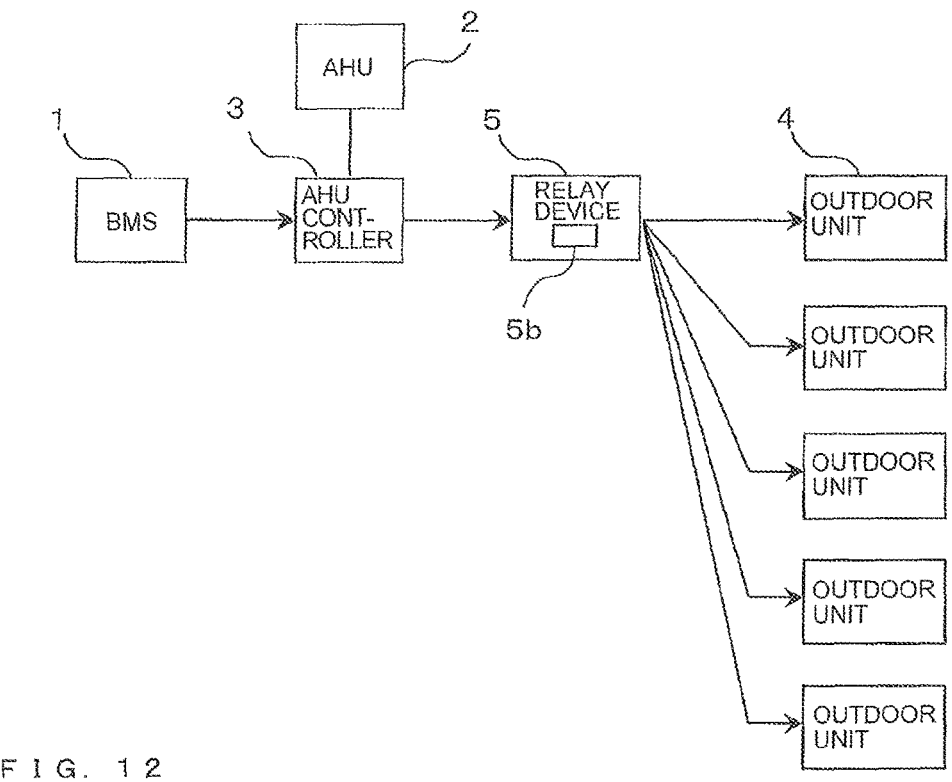
FIG. 11 is a system block diagram of an air-conditioning system according to Embodiment 3 of the present invention.

FIG. 11 is a system block diagram of an air-conditioning system according to Embodiment 3 of the present invention. In contrast to Embodiment 1 in which the same number of relay devices 5 as the number of outdoor units 4 have been needed, Embodiment 3 is configured to include one relay device 5, and basic concepts are similar to those of Embodiment 1.

With the air-conditioning system according to Embodiment 3, similar effects as those of Embodiment 1 may be obtained.

Embodiment 4

Figure 12:
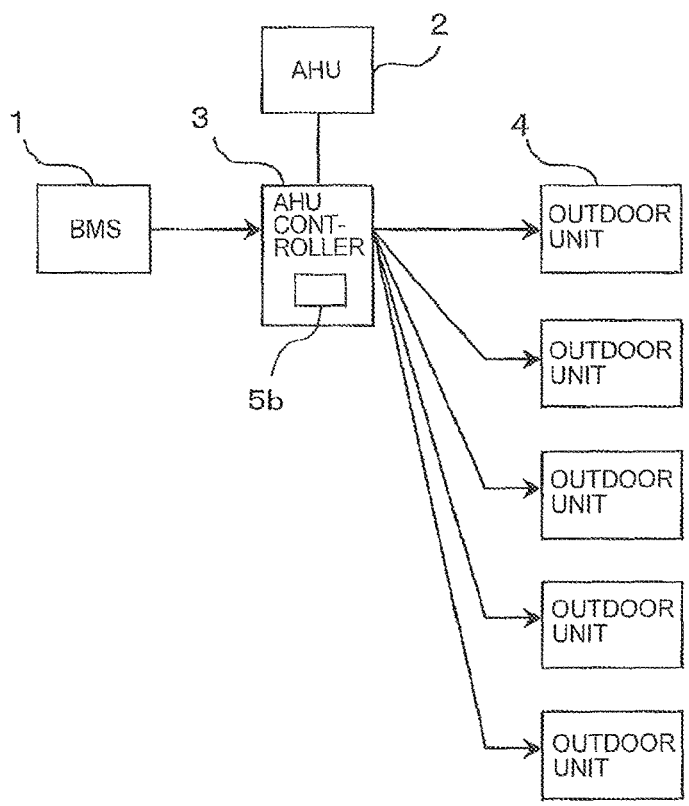
FIG. 12 is a system block diagram of an air-conditioning system according to Embodiment 4 of the present invention.

FIG. 12 is a system block diagram of an air-conditioning system according to Embodiment 4 of the present invention. Embodiment 4 adopts a configuration in which the AHU controller 3 includes the above-mentioned number control unit 5b. More specifically, the generation of the number control information, the operation of switching on/off the operation of each of the outdoor units 4, and the control on the operating frequencies of the compressors, which have been mainly performed by the relay devices 5 in Embodiment 1, are integrated into the AHU controller 3, and basic concepts are similar to those of Embodiment 1. This is mainly a case where the BMS 1 or the AHU controller 3 and the outdoor units 4 are products of the same manufacturer.

With the air-conditioning system according to Embodiment 4, similar effects as those of Embodiment 1 may be obtained.

REFERENCE SIGNS LIST

1 BMS 2 AHU 3 AHU controller 3a actuator control unit 3b capacity calculation unit 3c communication unit 4 outdoor unit 4a frosting detection unit 4b communication unit 4c control unit 5 relay device 5a interface unit 5b number control unit 6 refrigerant pipe 11 outlet air temperature sensor 12 heat exchanger inlet temperature sensor 13 in-construction temperature sensor 14 fresh air temperature sensor 21 first passage 22 second passage 23 louver 24 filter 25 air heat exchanger 26 air supply fan 27 indoor heat exchanger 28 louver 29 filter 30 air exhaust fan 40 remote control 41 compressor 42 four-way valve 43 outdoor heat exchanger 44 expansion valve 100 heat pump cycle 100A heat pump cycle 100B heat pump cycle 100C heat pump cycle 100D heat pump cycle 100E heat pump cycle

The invention claimed is:

1. An air-conditioning system, comprising:
a plurality of outdoor units each including a compressor, a pressure-reducing device, and an outdoor heat exchanger;
an air handling unit including a passage for exchanging air inside and outside a construction to perform ventilation, and an indoor heat exchanger through which the air inside the passage flows;
refrigerant pipes;
a plurality of independent heat pump cycles each being independently formed by connecting each of the plurality of outdoor units and the air handling unit by refrigerant pipes, each of the plurality of independent heat pump cycles including the compressor, the indoor heat exchanger, the pressure-reducing device, and the outdoor heat exchanger; and
a number control unit configured to:
in response to receiving a capacity demand corresponding to an air-conditioning load,
compute a required total operating frequency for the plurality of compressors which are connected by the refrigerant pipes, that satisfies the capacity demand corresponding to the air-conditioning load,
determine, based on the required total operating frequency, one predetermined frequency range of a plurality of predetermined frequency ranges associated with each of the compressors in operation,
wherein each predetermined frequency range of the plurality of predetermined frequency ranges is defined to achieve at least a predetermined compressor efficiency, and each predetermined frequency range has corresponding number control information, wherein each corresponding number control information defines a control of operating frequencies of the plurality of compressors based on a number of compressors in operation and a predefined high efficiency frequency range for each of the compressors, and
control the number of the compressors to operate and an operating frequency of each of the compressors in operation based on the control defined by the number control information corresponding to the one predetermined frequency range which is determined.

2. The air-conditioning system of claim 1, wherein the number control unit is further configured to control the number of the compressors to operate and the operating frequency of each of the compressors in operation so that a sum of the operating frequency of each of the compressors in operation becomes the required total operating frequency.

3. The air-conditioning system of claim 2, wherein the number control unit has number control information that defines a relationship among a total operating frequency, a number of compressors to operate, and the operating frequency of each of the compressors in operation, and wherein the number control unit is further configured to determine, based on the required total operating frequency determined by the computation and the number control information, the number of the compressors to operate and the operating frequency of each of the compressors in operation.

4. The air-conditioning system of claim 3, wherein the number control unit is further configured to perform, in satisfying the capacity demand, a number control in which
   one of the compressors is operated in an operating frequency within the corresponding one of the plurality of predetermined frequency ranges, when the required total operating frequency is within the corresponding one of the plurality of predetermined frequency ranges,
   the number of compressors in operation is sequentially increased in such a way that the operating frequency of each of the compressors in operation is within the corresponding one of the plurality of predetermined frequency ranges, when the required total operating frequency is not within the sum of the plurality of predetermined frequency ranges, and
   a number of compressors that operate at a maximum operating frequency thereof is increased while sequentially decreasing a number of compressors that operate at operating frequencies that are within the plurality of predetermined frequency ranges when the capacity demand are not satisfied even when all the compressors are operated in the plurality of predetermined frequency ranges,
   based on the required total operating frequency determined by the computation and the number control information.

5. The air-conditioning system of claim 3, wherein the number control unit is further configured to generate the number control information based on connected model information regarding a capacity and performance of the outdoor units, and on a number of connected outdoor units.

6. The air-conditioning system of clam 1, wherein the plurality of outdoor units have the same capacity.

7. The air-conditioning system of claim 6, wherein the number control unit is further configured to select the compressors to operate so that the compressors are operated with priority in ascending order in length of operation time.

8. The air-conditioning system of claim 1, wherein the plurality of outdoor units include a combination of outdoor units, a part or all of which have different capacities.

9. The air-conditioning system of claim 8, wherein the number control unit is further configured to select the compressors to operate so that the compressors are operated with priority in ascending order in capacity of the outdoor units.

10. The air-conditioning system of clam 1, further comprising:
    an air handling unit controller including:
        an actuator control unit configured to control an actuator included in the air handling unit;
        a capacity calculation unit configured to generate the capacity demand corresponding to the air-conditioning load; and
        a communication unit configured to transmit the capacity demand to the number control unit; and
    a relay device including an interface configured to perform communication between the air handling unit controller and the plurality of outdoor units,
    wherein the number control unit is included in the relay device.

11. The air-conditioning system of claim 10, wherein the relay device is included in each of the plurality of outdoor units.

12. The air-conditioning system of claim 1, further comprising:
    an air handling unit controller including:
        an actuator control unit configured to control an actuator included in the air handling unit;
        a capacity calculation unit configured to generate the capacity demand corresponding to the air-conditioning load; and
        a communication unit configured to transmit the capacity demand to the number control unit;
    a relay device including an interface to perform communication between the air handling unit controller and the plurality of outdoor units; and
    a remote control connectable to the relay device,
    wherein the number control unit is included in the remote control.

13. The air-conditioning system of claim 1, further comprising an air handling unit controller including:
    an actuator control unit configured to control an actuator included in the air handling unit;
    a capacity calculation unit configured to generate the capacity demand corresponding to the air-conditioning load; and
    a communication unit configured to transmit the capacity demand to the number control unit,
    wherein the number control unit is included in the air handling unit controller.

14. The air-conditioning system of claim 1,
    wherein each of the plurality of independent heat pump cycles includes a four-way valve configured to switch a direction in which refrigerant flows, and the switching of the four-way valve enables switching between a heating operation and a defrosting operation,
    wherein each of the plurality of outdoor units includes:
        a frosting detection unit configured to detect a frosting state of the outdoor heat exchanger; and
        a communication unit configured to transmit, before start of the defrosting operation of the outdoor heat exchanger of the outdoor unit, a detection result of the frosting detection unit to the number control unit, and
    wherein the number control unit is further configured to control a timing to perform the defrosting operation of the each of the plurality of outdoor units based on the detection result from each of the plurality of outdoor units.

* * * * *